United States Patent
Kiegerl et al.

(10) Patent No.: US 8,364,353 B2
(45) Date of Patent: Jan. 29, 2013

(54) SYSTEM FOR THE AUTOMATIC MOVEMENT OF MATERIAL

(75) Inventors: Christoph Kiegerl, Graz (AT); Leke Ukimeraj, Zell am See (AT); Markus Huber, Wagrain (AT)

(73) Assignee: Liebherr-Werk Bischofshofen Ges.m.b.H., Bischofshofen (AT)

( * ) Notice: Subject to any disclaimer, the term of this patent is extended or adjusted under 35 U.S.C. 154(b) by 1198 days.

(21) Appl. No.: 12/214,306

(22) Filed: Jun. 18, 2008

(65) Prior Publication Data
US 2009/0076674 A1    Mar. 19, 2009

(30) Foreign Application Priority Data
Jun. 19, 2007  (DE) .................. 20 2007 008 557 U

(51) Int. Cl.
G06F 7/70      (2006.01)

(52) U.S. Cl. .............. 701/50; 700/245; 701/23

(58) Field of Classification Search .............. 701/23, 701/25, 26, 50, 301; 700/245
See application file for complete search history.

(56) References Cited

U.S. PATENT DOCUMENTS

| | | | |
|---|---|---|---|
| 4,261,161 A * | 4/1981 | Colgrove et al. ............. 460/3 |
| 6,363,632 B1 | 4/2002 | Stentz et al. | |
| 6,539,294 B1 | 3/2003 | Kageyama | |
| 7,756,614 B2 * | 7/2010 | Jouppi ....................... 701/25 |
| 7,925,368 B2 * | 4/2011 | Kim .......................... 700/112 |
| 2004/0158355 A1* | 8/2004 | Holmqvist et al. ........ 700/245 |
| 2006/0129276 A1* | 6/2006 | Watabe et al. ............. 700/245 |
| 2007/0168071 A1* | 7/2007 | Kim .......................... 700/112 |
| 2007/0193798 A1* | 8/2007 | Allard et al. ............... 180/169 |
| 2008/0086236 A1* | 4/2008 | Saito et al. ................. 700/245 |

FOREIGN PATENT DOCUMENTS

| | | |
|---|---|---|
| DE | 1924741 | 11/1970 |
| DE | 68918464 | 5/1995 |

* cited by examiner

*Primary Examiner* — Helal A Algahaim
(74) *Attorney, Agent, or Firm* — Dilworth & Barrese, LLP.

(57) ABSTRACT

The present invention relates to a system for the automatic movement of material in a working area comprising at least one movable piece of equipment, wherein the system has a control for the automatic movement of the piece of equipment with an automatic recognition of obstacles. In accordance with the invention, the control has a first obstacle processing function which moves an obstacle in the working area automatically using the movable piece of equipment; and/or in that the control has a second obstacle processing function which automatically removes an obstacle from the working area using the movable piece of equipment.

24 Claims, 2 Drawing Sheets

SYSTEM FOR THE AUTOMATIC MOVEMENT OF MATERIAL

BACKGROUND OF THE INVENTION

The present invention relates to a system for the automatic movement of material in a working area comprising at least one movable piece of equipment, wherein the system has a control for the automatic movement of the piece of equipment with an automatic recognition of obstacles.

Such a system is advantageously used in a working area in which the movable piece of equipment automatically loads material at one or more loading sites and unloads it again at one or more unloading sites. Free areas are usually disposed between the loading sites and the unloading sites which have to be negotiated in driving operation.

The movable piece of equipment usually has a tool, in particular a bucket, which can advantageously be raised via a lifter and is moreover pivotable, for the taking up and transportation. In particular a wheeled loader is advantageously used as a movable piece of equipment in the system in accordance with the invention. In this connection, all the loading and unloading work as well as the transportation work is advantageously carried out driverless.

Such a system for the automatic movement of material in a working area in particular complies with the constantly increasing demands on construction machinery and construction equipment with respect to capacity, efficiency and damage minimization since conventional systems can only be operated under a high cost effort due to increasing labor and wage costs and to the high qualification of the operators required for the optimum workload of the work machines.

SUMMARY OF THE INVENTION

The system in accordance with the invention, in contrast, can carry out the whole work process, optionally in combination with further systems, completely automatically with respect to extraction and loading back, with the automatic control or automatic operation of this system providing the following advantages:
  increase in efficiency due to constant transfer work;
  process optimization in the extraction chain;
  operation independently of standard working hours;
  multishift operation without additional personnel capacity;
  machine operation optimized for the service life;
  minimization of the energy requirement due to efficiency-optimized machine regulation.

The present invention relates in this connection to a system for the automatic movement of material in a working area in which the movable piece of equipment, e.g. a wheeled loader, travels along a travel path autonomously between a loading site and an unloading site.

Obstacles can, however, be present in the working area which impede the free movement of the piece of equipment. Such obstacles can, for example, be stones or blocks which already spill over onto the shunting area or onto the travel paths on the material extraction such as in the blasting operation or which collect during the material transfer by material loss from the piece of equipment. Furthermore, damage to the surface of the travel path such as potholes can represent obstacles since driving over such positions can damage the piece of equipment.

It is therefore known from U.S. Pat. No. 6,539,294 B1 for an automated transportation system with dump trucks to automatically recognize obstacles in the working area and to store their position so that they can be driven around automatically by the dump trucks.

Such a driving around of obstacles in the working area, however, leads to detours and delays in the work process which can substantially impair the efficiency of the automated system.

It is therefore the object of the present invention to provide a system for the automatic movement of material in a working area which has improved efficiency, in particular in the handling with obstacles.

This object is satisfied in accordance with the invention by a system described herein. In accordance with the invention, the control of the system has a first obstacle processing function which automatically moves an obstacle in the working area with the movable piece of equipment and/or a second obstacle processing function which automatically removes an obstacle from the working area. Due to this obstacle processing function, the obstacle no longer has to be driven around in an inconvenient manner, but can rather either be completely removed from the working area, e.g. in that it is taken up by the piece of equipment and transported to an unloading site, or is at least moved into a region in which it is disposed outside the travel path and no longer has to be driven around. The system in accordance with the invention in particular makes use of the extended possibilities of the piece of equipment in accordance with the invention which can take up and/or move material independently.

The system in accordance with the invention advantageously has one or more positioning systems for the detection of the effective location of the piece of equipment, preferably GPS and/or DGPS and/or rotational laser systems and/or stationary and/or mobile microwave systems (LPS) and/or odometric data. A combination of at least two of these systems can in particular be used for reasons of redundancy and security.

The movable piece of equipment advantageously has a tool, in particular a bucket, with which it can take up and transport material, with the tool advantageously being used to remove the obstacle as a first obstacle processing function and/or to move the obstacle as a second obstacle processing function. A wheeled loader is in particular used such as is used in manifold manner in mining operations to transport material from a loading site to an unloading site. The possibility of the movable piece of equipment in accordance with the invention of taking up and transporting material independently can be used ideally by the automatic system in accordance with the invention to eliminate obstacles in the working area. Obstacles hereby only have to be driven around in exceptional cases, namely when the loading is not possible due to the property of the obstacle. Said obstacles are moved into a no longer problematic position or are fully removed as standard.

The control in accordance with the invention advantageously has a third obstacle processing function in which the obstacle is driven around by the movable piece of equipment. In this process, the control selects between the first obstacle processing function and the second obstacle processing function to be able to react flexibly to the respective obstacle.

The position of the obstacle is advantageously stored and taken into account in the calculation of future paths so that it is automatically driven around in subsequent worksteps. The position of the obstacle is advantageously equally made available to further pieces of equipment so that they can likewise drive around the obstacle.

The working area of the system in accordance with the invention advantageously has at least one loading site and at least one unloading site at which the movable piece of equipment automatically takes up or puts down material. In this process, material is loaded from the excavated material at the loading site and is then unloaded at the unloading site for the filling of a crushing machine or of the loading area of a transport vehicle.

In this connection, the work equipment is advantageously controlled during the return trip from the unloading site to the loading site in such a manner that small obstacles and contamination areas are continuously removed from the travel paths. A particularly efficient operation can thus be ensured by the continuous cleaning of the travel paths.

Further advantageously, the working area has a loading or unloading site to which the obstacle is transported to remove it from the working area. An optimum possibility thus results for the elimination of the obstacle in particular when the obstacle is material which has fallen off on the moving of the piece of equipment since the obstacle had anyway to be transported to the unloading site. The movable piece of equipment takes up the obstacle and transports it to the unloading site where it is e.g. further processed in a crusher or is transported on by a transport vehicle.

Further advantageously, the obstacle is moved to a different position in the working area if the obstacle cannot be removed from the working area or if a defined number of loading attempts has failed. If the obstacle can therefore not be removed, it is at least moved to a position in the working area at which it less disturbs the transport operation by the piece or pieces of equipment. It can hereby likewise be prevented that the obstacle has to be driven around every time in driving operation.

The obstacle is furthermore only driven around if a movement or removal is not possible. An optimum efficiency of the system in accordance with the invention for the automatic movement of material is thus ensured since obstacles are always removed or moved when this is possible, whereas the driving around is only selected as the last possibility to continue the operation despite the obstacle.

In this connection, in the system in accordance with the invention, the obstacle is advantageously classified with reference to sensor data, with the obstacle processing function to be applied being selected on the basis of the classification. The system in accordance with the invention therefore determines with reference to the sensor data whether a removal or movement of the obstacle is possible. The removal of the obstacle has the highest priority in this connection; the movement into a less disturbing position the second highest priority; and the driving around the obstacle the lowest priority.

An obstacle which cannot be moved or removed is advantageously indicated on a display in this connection. If the automated system therefore recognizes an obstacle which would have to be driven around, this is shown on a display so that the operator can react as required.

The system in accordance with the invention advantageously has a remote-controlled and/or a manual operating mode in addition to the automatic operating mode. The operator can in particular then decide whether an obstacle is removed in the remote-controlled and/or manual operating mode or whether the obstacle will still be driven around in the automatic operating mode.

For this reason, with the system in accordance with the invention, an obstacle which cannot be moved or removed is advantageously shown on a display and a selection option is made possible for the user or the monitoring personnel of the system by which a change can be made into the remote-controlled and/or manual operating mode or driving can continue in the automatic operating mode.

In the system in accordance with the invention, the obstacle is advantageously detected, advantageously 3-dimensionally, using sensors at the piece of equipment. In this connection, sonar, radar, active or passive infrared sensors, laser systems such as lidar and stereo vision cameras can, for example, be considered as sensors. The result of such systems is the spatial imaging of the environment, with in particular a combination of different sensors increasing the precision and providing a redundant system. Furthermore, a combination of a plurality of systems can be necessary to minimize individual components e.g. due to weather influences.

On moving toward the object, the sensor system delivers information on the geometry of the surface which allows a recognition and classification of the obstacle.

Advantageously, the obstacle is, optionally, moved toward several times from different directions for the more precise detection. The spatial detection of the object for the recognition of an obstacle can thus be substantially improved. In particular sufficient information is thus available to classify the obstacle and to select the correct processing strategy.

The present invention furthermore comprises a system for the automatic movement of material in a working area having at least one movable piece of equipment, with the system having a control for the automatic movement of the piece of equipment with an automatic recognition of obstacles, with the vehicle vibrations and/or vehicle loads being determined on the driving over of the working area and with the position being moved over being evaluated as a obstacle on an exceeding of a permitted value range, with the position of said obstacle advantageously being stored in order optionally to drive around it. Such an automated recognition of obstacles with reference to the vehicle vibration and/or vehicle load e.g. enables the automatic recognition of potholes which is often only very difficult using optical sensors. A considerably improved obstacle recognition can thus be achieved by the system in accordance with the invention.

It is evident to the person of ordinary skill in the art in this connection that such an improved obstacle recognition is of great advantage independently of the obstacle processing strategy. However, a particularly advantageous use in particular results in cooperation with the control described above which has different obstacle processing functions. The obstacle detected in this manner can advantageously be stored and driven around. Furthermore, an automatic function can advantageously be provided for the filling of potholes using the material transported by the movable piece of equipment.

The present invention furthermore includes a system for the automatic movement of material in a working area having at least one movable piece of equipment, with the system having a control for the automatic movement of the piece of equipment, with material of different composition being able to be processed and with a desired mixing ratio being achieved automatically by a corresponding control of the movable piece or pieces of equipment. In this connection, in particular a plurality of loading sites can be present which have material of different composition. To compensate these differences in composition or to realize a specific mixing ratio, the loading sites can be traveled to with a corresponding pattern.

It is evident in this connection that such an automatic setting of a desired mixing ratio is of great advantage independently of the obstacle recognition. A particularly effective operation is, however, particularly possible by the combination with the obstacle processing function in accordance with the invention in particular due to the substantially increased complexity of the travel path in such an automatic setting of a mixing ratio.

In the system in accordance with the invention, the composition of a material region traveled to by the movable piece of equipment is advantageously automatically recognized, in particular on the basis of sensors arranged at the piece of equipment, with the sensors advantageously simultaneously serving the obstacle recognition. In this connection, sonar, radar, active or passive infrared sensors, laser systems such as lidar and stereo vision cameras can, for example, be considered as sensors. It is hereby possible after the traveling to e.g. a mining front to automatically recognize which composition the material there has. The corresponding mixing ratio can be set automatically via this. Equally, these data can be used for the better classification of obstacles since a better decision can be made on whether the obstacle can be removed or has to be driven around by the knowledge of the composition of the obstacle.

The system in accordance with the invention advantageously furthermore comprises a track planning unit which calculates paths from a loading site to an unloading site and/or back, in particular based on an amended terrain model and detected obstacles. This track planning unit thus sets the travel path for the movable piece of equipment.

The system in accordance with the invention advantageously has an input unit via which standard travel paths can be preset. At the start of the working shift, manual standard travel paths can thus be input which can serve as the basis for the track planning unit. Loading and unloading sites can equally be input via the input unit.

The calculation of the paths for the movable piece or pieces of equipment advantageously takes place while taking account of standard travel paths and recognized and/or stored obstacles. The actually moved paths are thus optimized with reference to the facts gained during the operation.

Further advantageously, the system comprises an input unit via which a desired mixing ratio of the material can be preset. It can also be preset here at the start of the shift which average composition is desired at the unloading site.

The calculation of the paths advantageously then takes place while taking account of a desired mixing ratio of the material, in particular in that loading sites with different material compositions are alternately selected. Desired mixing ratios can thus be set automatically or differences in the composition can be automatically compensated at the loading sites.

The calculation of the paths and/or of the terrain model advantageously takes place while taking account of the geometry of the working area changing by the material removal or of any other terrain changes, in particular determined from position data and/or odometric data of the machine and/or data of the obstacle recognition. The geometry of the working area during the operation of the system is changed by the removal and transportation of material, which is advantageously taken into account in the calculation of the paths. The track planning unit advantageously comprises a 3-dimensional model of the working area which can be prepared and/or updated e.g. with reference to position data and sensor data of the movable piece of equipment.

Furthermore, a plurality of pieces of equipment are advantageously provided in the system in accordance with the invention whose movement is taken into account in the calculation of the paths in that an exchange of data takes place within the plurality of pieces of equipment. A collision of the pieces of equipment is thus avoided and an ideal working procedure is guaranteed.

The system in accordance with the invention, in particular the control for the recognition and processing of obstacles, is furthermore advantageously integrated in the movable piece of equipment so that it can act substantially autonomously. The system, however, advantageously furthermore comprises a stationary control unit which is connected to the movable piece of equipment e.g. via a radio connection so that an operator can intervene in the control of the movable piece of equipment at any time.

Further advantageously, the movable piece of equipment is moreover also usable completely manually without use of the system for the automated movement of material.

Even if the present invention has previously only been described in connection with the system in accordance with the invention, it is nevertheless obvious to the skilled person that the methods in accordance with the invention are also of great advantage for obstacle processing independently of the system itself so that the present invention also includes the corresponding methods themselves. The present invention in particular includes a method for the control of a piece of equipment in which an obstacle is automatically moved in the working area and/or is removed from the working area by means of the movable piece of equipment.

BRIEF DESCRIPTION OF THE DRAWINGS

The present invention will now be explained in more detail with reference to an embodiment and to the drawings. There are shown.

DESCRIPTION OF THE PREFERRED EMBODIMENTS

Figure 1:
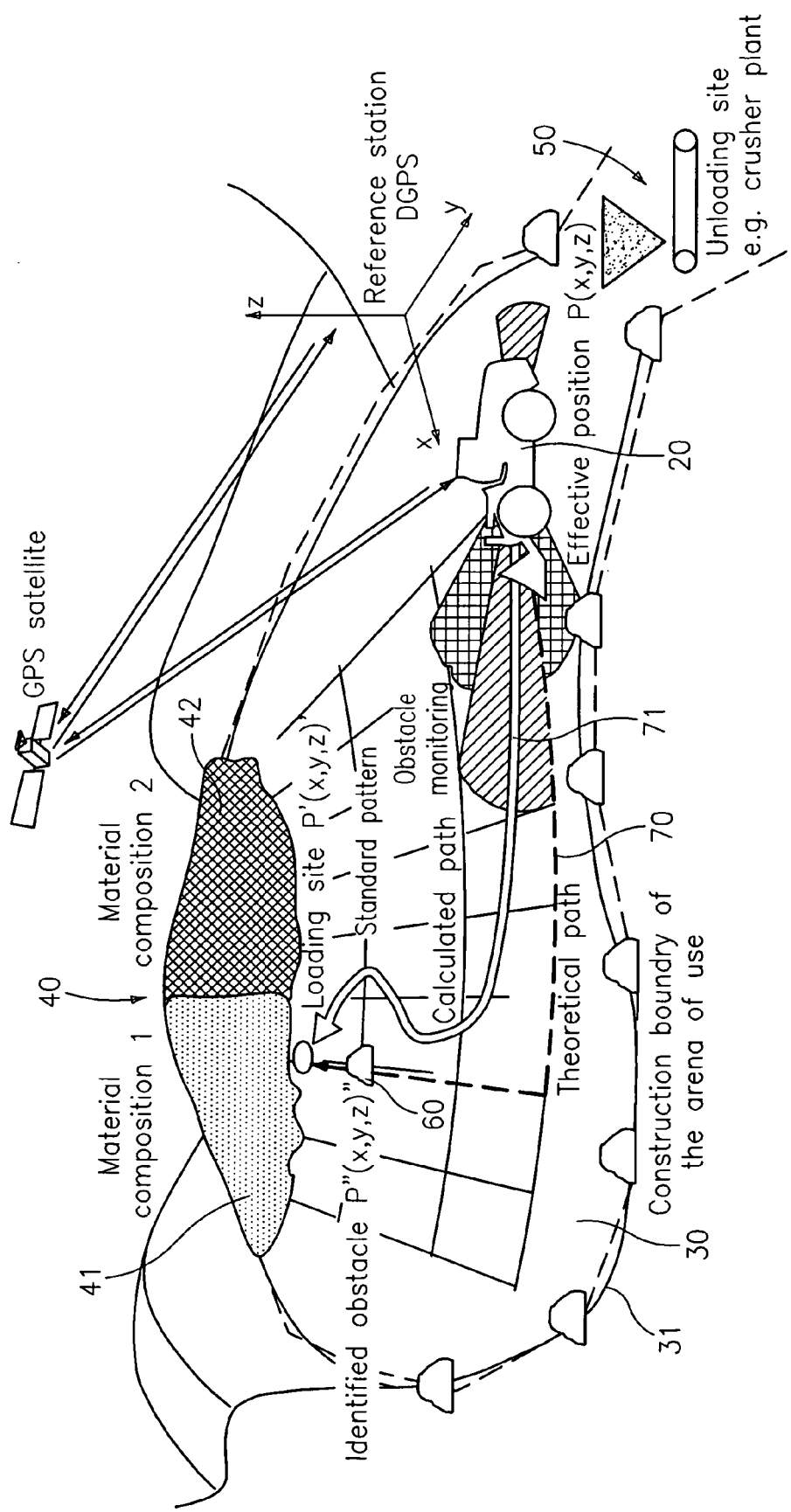
FIG. 1: a graphic representation for the use of the system in accordance with the invention in a working area.

FIG. 1 shows a working area 30 into which one or more autonomously working movable pieces of equipment 20 move, with the work process typically consisting of the loading, transporting and unloading of a bulk good.

The working area 30 is advantageously bounded by construction measures to prevent an uncontrolled passing over of these boundaries by the autonomously working pieces of equipment. This is e.g. ensured by a construction boundary 31 of the area of use. Furthermore, it is ensured by an enclosure that an ingress into the area by unauthorized persons during the automatic operation can be prevented.

The working area 30 typically consists of regions in which material is loaded from the excavated material, free areas which are negotiated in driving operation and one or more unloading sites 50 such as a funnel for the filling of a crusher or an area for the loading of trucks. The movable piece of equipment takes up material at a loading site 40 and transports it over a specific path to the unloading site 50 where the movable piece of equipment unloads the material again. In this connection, the system autonomously determines the travel path between the loading site and the unloading site, with all loading and unloading work being carried out in a driverless manner.

In addition, the system is in a position to recognize obstacles 60 on the travel path and to handle the obstacle 60 in accordance with a processing strategy. The movable work machine 20, however, continues to be operable manually like a standard piece of equipment and can furthermore be remote-controlled, in particular via a radio remote control.

The control of the system in accordance with the invention comprises the partial systems of wheeled loader, navigation and obstacle treatment which are linked to one another and which are realized in a central control unit. The partial system of the wheeled loader comprises the routines of driving, steering and working. The partial system of the navigation comprises the routines of terrain model, position determination and track planning. The partial system of obstacle treatment comprises routines for the recognition and identification of obstacles as well as routines for the processing of obstacles.

Figure 2:
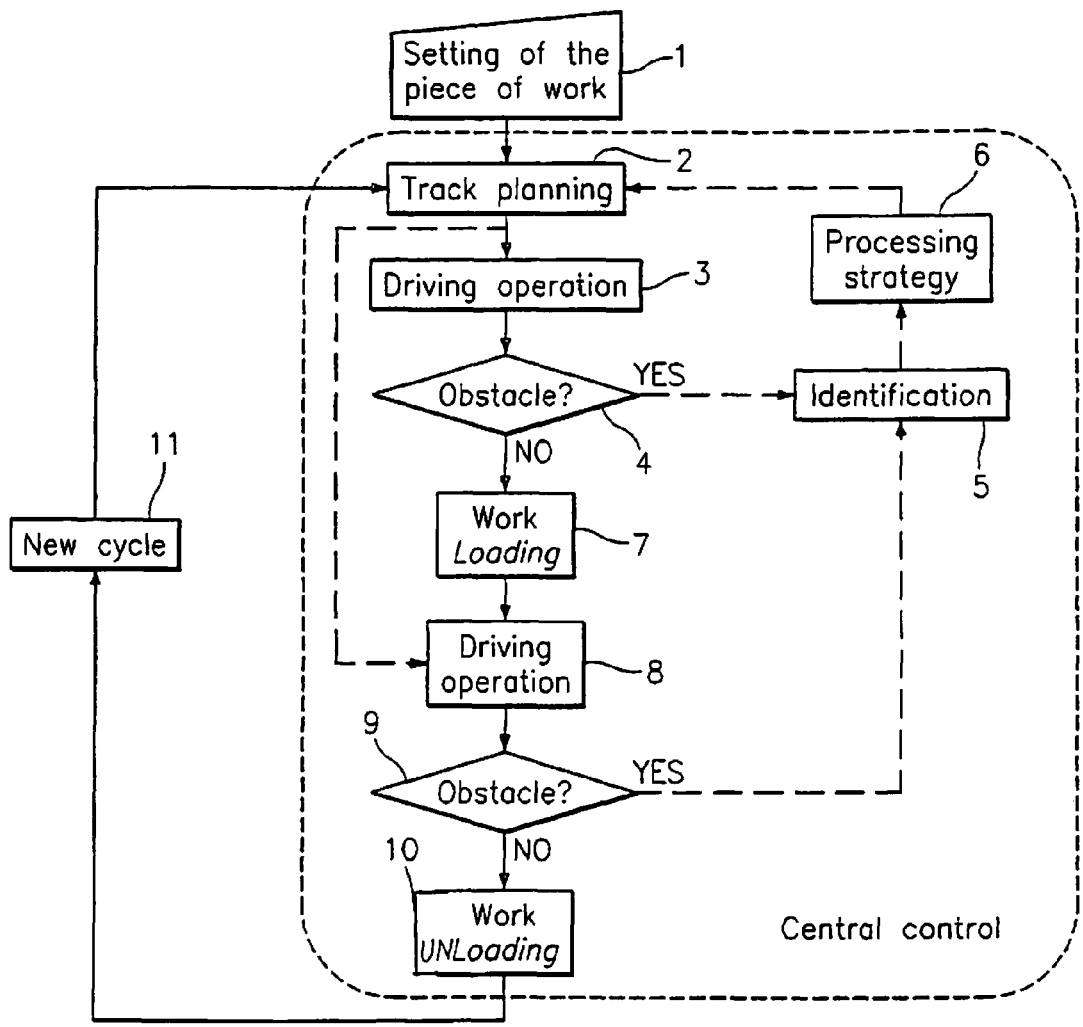
FIG. 2: a flowchart of a work procedure in accordance with the invention on the automatic movement of material by the system in accordance with the invention.

FIG. 2 shows a flowchart of a typical work routine. In this connection, in a step 1, a piece of work is first set, in particular by manual input of the loading and unloading sites as well as of standard paths. Based on this information, in a step 2, a path for the piece of equipment is calculated in the track planning, with the track planning making use of data of a 3-dimensional terrain model as well as of data from the position determination of the piece of equipment and of the changing mining front.

In the following driving operation either the loading site is driven to in a step 3 or the unloading site is driven to in a step 8. If the obstacle handling recognizes an obstacle, it is identified in a step 5 and classified correspondingly to select the required obstacle processing function in a step 6.

Based on the selected obstacle processing strategy, a new path is calculated in the track planning which optionally also includes work steps. The obstacle can in particular optionally be loaded here and moved to the loading or unloading site where it is unloaded. Alternatively, the obstacle can also be pushed away from the travel area.

If neither of these alternatives is possible, the obstacle can also be driven around, with it advantageously being stored in the terrain model.

Once the obstacle has been correspondingly processed, the work routine can be continued, with an empty piece of equipment first being loaded at the loading site in a step 7, whereas a full piece of equipment is unloaded at the unloading site in a step 10. Once the piece of equipment has been unloaded, a new cycle starts in a step 11, with the track planning setting a new trip.

The systems and partial systems of the present invention will not be presented again in detail in the following.

1. Wheeled Loader

The subsystem wheeled loader comprises the areas of driving, steering and working.

1.1 Driving

The piece of equipment has a traction drive which is controlled via the central control unit. In this connection, it can be a question of systems which correspond to the prior art such as hydrostatic or hydrodynamic drives and transmissions as well as future transmissions with torque division and electrical drives or combinations of these variations.

In accordance with a preset travel path and the zones of the working area driven through, corresponding target speeds are preset which can be realized by the machine in dependence on the loading state, provided the property of the path allows it. A conclusion can be drawn on the vibration stimulation by the travel path by monitoring the time developments of the longitudinal inclination of the vehicle by means of an inclination sensor and/or of the vehicle accelerations by means of an acceleration sensor. Based on this, the set target speed is corrected and the control of the traction drive is modified.

Furthermore, damage to the travel path (potholes) can be recognized by detection of the vehicle vibrations so that the target vehicle speed can be reduced on a repeated driving over this position or so that, optionally, this coordinate has to be driven around (see obstacle handling in section 3 in this respect).

The determination of the target course or of the track is described in more detail in section 2.3. The control of the traction drive should take place in an ideal manner so that those working areas of the transmission are selected by the control which ensure maximum efficiencies.

When driving over constantly unchanging travel paths, for example on the negotiation of height differences or on the exact positioning of the machine at an unloading site, the possibility is also considered of locking the machine to a specific travel track, e.g. by means of a guide wire in the travel path.

1.2 Steering

During the driving operation, the machine is automatically guided along a preset target course (or path) (see section 2.3.2). The steering angle of the machine is corrected in accordance with the deviation of monitored actual course from the target course. Furthermore, the steering angle of the machine is modified on the carrying out of a calculated obstacle processing strategy (see section 3.2), provided it sets an evasion or driving around of the object.

1.3 Working

The subsystem working includes all control strategies and algorithms required for the control of the working hydraulic system—that is for the automatic movement of the work equipment.

In this connection, the bucket filling process (7) in FIG. 2 represents a substantial part module with respect to the extent and complexity of the strategies and algorithms for ensuring a constantly maintained degree of bucket filling.

As soon as the machine recognizes by monitoring the location on the work plane that the machine is located in front of the excavated material and the travel path in front of the planned loading site of a loading area is free of obstacles, the routine automatic digging is activated, starting with the positioning of the piece of equipment in a position typical for the bucket process. The bucket is positioned in this process such that a displacement of the travel path takes place on the further moving toward the excavated material. It is thus ensured that the shunting zone or the travel path is kept free of material. Then the filling of the bucket takes place by a corresponding bucket filling routine.

The emptying of the bucket (10) in FIG. 2 takes place at a position which is designed for this and which can be made, for example, as a funnel. The bucket is typically fully tilted in this connection.

The monitoring of the terrain or of the travel path for the recognition of obstacles takes place during the driving operation. The object is moved around or the movement routines of the working apparatus is controlled in a manner to remove the obstacle from the work area or shunting zone in dependence on the selected processing strategy (section 3).

2. Navigation

The subsystem navigation is composed of the three partial areas of terrain model, position determination and track planning.

2.1 Terrain Model

To be able to link the coordinates determined by means of a position determining system with the location on the working area, it is necessary first to detect the working area position-wise and height-wise. This can be done using a commercial measurement tool by detection in a local coordinate system. In this model, the boundaries of the working area are detected as well as the fixedly present obstacles which have to be driven around by the machine. Furthermore, the loading areas are to be detected to be able to distinguish between loadable material and subsoil on the loading procedure.

This terrain model is constantly updated during the work procedure of the autonomous machine, for example by detection of the extent of the excavated material or of its change by material removal in the loading procedure as well as the position-wise detection of the location of obstacles which are detected during the working process and have to be driven around based on the processing strategy.

Primarily, the evaluation or change of the mining front of a bulk material cone or the material extent of other loading areas is detected by means of a sensor system which is also used for the obstacle recognition (see section 3). The terrain is scanned by means of the sensor system during the driving operation and deviations from the starting terrain model are detected and corrected. In the partial system of obstacle handling, a decision is made on whether the deviations from the 3 D terrain model are obstacles or changes to the mining front.

2.2 Position Determination

The machine has a position determining system corresponding to the prior art for the detection of the effective location on the working area (see FIG. 1), for example
  Global Positioning Systems (GPS),
  Differential Global Positioning Systems (DGPS), with the accuracy being increased by using this system, furthermore
  Rotation Laser Systems, and
  Stationary or mobile microwave systems (Local Positioning Systems) as well as
  Odometric data.

The use of these systems can also take place in combined form depending on demands, for example to ensure a redundant operation.

During the autonomous operation of the machine, the effective position is determined at each calculation step of the machine control and the deviation from the preset travel path is determined with the aid of these data. The steering angle is corrected and an intervention made in the traction drive in accordance with this deviation.

As already previously described, the determination of the position of the machine also takes place during the bucket filling procedure. Furthermore, a conclusion can be made on the position of the bucket via the geometry of the piece of equipment in order to update the 3 D terrain model. Odometric data can also be used for this purpose which detect the path covered from the recognition of the contact with the excavated material.

2.3 Track Planning

2.3.1 Standard Pattern

Depending on the property of the working area and on the local arrangements of loading and unloading areas and on fixed obstacles, the working area is first provided with a standard pattern (see FIG. 1) of travel paths which set a specific basic scheme for the processing of the material transfer.

These paths are, however, not necessarily processed sequentially, but can also be moved to variably in accordance with a desired mixing ratio of the material to be loaded or based on a setting from the obstacle handling. Furthermore, it is necessary to move to the same path repeatedly, provided that this is set by the amount and extent of the material to be loaded.

Beginning from a start position, for example in the vicinity of the unloading site, the machine starts the loading process along a path of the standard pattern. These target paths can be described mathematically in the plane, with different target paths absolutely being able to be identical section-wise.

At the start of a shift or of a piece of work, there is the possibility of setting a mixing ratio of the material to be loaded at a contiguous loading area (e.g. the bulk material cone of a quarry) or at a plurality of individual loading areas, which offers the possibility of
  compensating different geological compositions of the material of a excavated material cone or of a mining front to be loaded at the unloading position; and
  realizing specific mixing ratios.

Based on this, the track planning module calculates a pattern in which combination the loading areas can be moved to, with this pattern being constantly updated during operation in that geometrical data of the changing mining front(s) as well as position information of any obstacles to be driven around being taken into the terrain model.

2.3.2 Travel Route Preparation—Real Target Paths

Based on the underlying standard pattern, on a manual setting of the pieces of work and on the terrain model updated online, an area at the mining front of a cone of bulk material determined position-wise or a real target path is calculated by the control at a specific position of a plurality of loading sites, said target path taking account of the movement space of the machine (tractrix). The effective travel route is based on an updated terrain model—adjusted mining front as well as information on the strategic processing of obstacles—with this target path being constantly modified during driving operation.

This target path between the points loading site and unloading site can typically be represented mathematically, with specific sections of this curve—for example in the area of the unloading position or in the negotiating of height differences—being able to be the same in each loading routine.

3. Obstacle Handling

The partial system of obstacle handling includes, on the one hand, the recognition and identification of objects on travel paths of the working area—see (4) and (9) in FIG. 2—on the other hand, a decision is made on how to treat the object in the further development, set by a processing strategy (6).

Obstacles can, for example, be stones and blocks which are already put onto the shunting area or the travel paths during the material excavation (blasting) or which collect during the material transfer by material loss of the bucket or movements of the bulk material cone. Furthermore, damage to the surface of the travel path can be interpreted as an obstacle which can bring about a component-damaging influence due to the stimulation on the vehicle.

3.1 Recognition and Identification

The detection of obstacles takes place by monitoring of the working area by means of suitable sensors or sensor combinations, for example Sonar (Sound Navigation and Ranging),
Radar (Radio Detection and Ranging),
Active or passive infrared sensors, and
Laser (lidar), as well as
Stereovision cameras.

The result of these systems is the spatial imaging of the environment, with the combination of such sensors increasing the accuracy, on the one hand, and simultaneously being available as a redundant system. Furthermore, the combination of the systems is necessary to minimize impairment of individual components by weather influences (snow, rain, fog, dust).

The recognition of an obstacle represents the first step of identification. The sensor system delivers information on the geometry of the surface on the moving toward the object; furthermore, the position is stored in the terrain model by the positioning system. In multi-machine operation, this information is also provided to other machines.

To be able to evaluate the object for the purpose of the selection of a processing strategy, said object must be spatially detected. On the recognition of an obstacle, the object has to be traveled to several times—from different directions—under certain circumstances to be able to determine its volume and shape. This information classifies the obstacle and enables the selection of a specific processing strategy.

The classification of obstacle objects distinguishes the system in accordance with the invention from already known systems since those systems for obstacle recognition are only used for the autonomous control of pieces of equipment which can basically only evade a non-negotiable obstacle.

In addition to these non-moved obstacles, in multi-machine operation, the movements of the further machines are also detected, with these machine control systems communicating among one another and the obstacle data being compared with the position data to identify a further machine.

3.2 Processing Strategy

By setting a processing strategy, a possibility is given for a loading machine to process an obstacle, preferably
(1) loading the object and transporting it to the unloading site,
(2) pushing the object to a different position on the working area if the loading is not possible or if one or more loading attempts have failed, or
(3) leaving the object at its position and storing its geometry in the 3 D terrain model, provided a movement of the obstacle is not possible.
However, this variant represents the last desired one since the objects have to be driven around.

Obstacles which come to lie close to the mining front would prevent the reaching of the loading site so that under certain circumstances a specific partial area of the bulk material cone could not be removed.

If an obstacle object is identified as unmovable due to its volume and extent, this is shown on a monitoring display. The monitoring personnel is responsible for deciding whether to abort the autonomous material transfer to eliminate the obstacle object in manual or remote-controlled operation and subsequently to continue the autonomous operation, or to manually remove the object only after the end of the shift.

The present system for the automatic movement of material in a working area is thus substantially more flexible and more efficient than previously known systems since obstacles in the travel region normally no longer have to be driven around, but are removed.

Furthermore, the paths determined by the track planning are adapted to the conditions substantially more flexibly than in the prior art. The paths can, for instance, be modified accordingly with reference to the processing of an obstacle strategy. It is equally possible to modify the paths based on a desired mixing ratio of the material or based on a plurality of loading areas. The system in accordance with the invention can thus autonomously set the composition of the material at the unloading site by a corresponding adaptation of the paths in addition to the improved obstacle handling.

In addition, an improved recognition of damage in the travel path such as potholes results which are recognized via the detection of vehicle vibrations and/or vehicle strains by the system in accordance with the invention.

In this connection, a substantial increase in efficiency is possible by every single one of these components of the system in accordance with the invention, with in particular the combination of the individual elements, however, providing an ideal system for the automatic movement of material in a working area which works particularly effectively and cost-effectively.

The invention claimed is:

1. A system for the automatic movement of material in a working area comprising at least one movable piece of equipment which is a wheeled loader, wherein
   the system has a control for the automatic movement of the piece of equipment with an automatic recognition of obstacles,
   the control has a first obstacle processing function which moves an obstacle in the working area automatically using the movable piece of equipment,
   the control has a second obstacle processing function which automatically removes an obstacle from the working area using the movable piece of equipment, and
   the control has a third obstacle processing function in which the obstacle is driven around by the movable piece of equipment,
   the second obstacle processing function has the highest priority with removal of the obstacle from the working area attempted first,
   if it is not possible to remove the obstacle from the working area, then the first obstacle processing function has the next highest priority with movement of the obstacle to a less disturbing location within the working area attempted next, and
   if it is not possible to remove the obstacle to a less disturbing position within the working area, then the third obstacle processing function has the next highest priority with the movable piece of equipment driven around the obstacle.

2. A system in accordance with claim 1, which uses one or more positioning systems for the detection of the effective location of the piece or equipment, preferably GPS and/or DGPS and/or rotational laser systems and/or stationary and/or mobile microwave systems (LPS) and/or odometric data.

3. A system in accordance with claim 1, wherein the movable piece of equipment has a tool, in particular a bucket, with which it can take up and transport material; and the tool is advantageously used for the removal of the obstacle as a first obstacle processing function and/or for the movement of the obstacle as a second obstacle processing function.

4. A system in accordance with claim 1, wherein the position of the obstacle is stored and is taken into account in the calculation of future paths.

5. A system in accordance with claim 1, wherein the working area has at least one loading site and at least one unloading site at which the movable piece of equipment automatically takes up or puts down material.

6. A system in accordance with claim 1, wherein the work equipment is controlled during the return journey from the unloading site to the loading site in a manner such that small obstacles and contamination areas are continuously removed from the travel paths.

7. A system in accordance with claim 1, wherein the working area has loading or unloading sites to which the obstacle is transported to remove it from the working area.

8. A system in accordance with claim 1, wherein the obstacle is moved to a different position in the working area when the obstacle cannot be removed from the working area or a defined number of loading attempts has failed.

9. A system in accordance with claim 1, wherein the obstacle is classified on the basis of sensor data and the obstacle processing function to be used is selected based on the classification.

10. A system in accordance with claim 1, wherein an obstacle which cannot be moved or removed is shown on a display.

11. A system in accordance with claim 1, which has a remote-controlled and/or a manual operating mode in addition to the automatic operating mode.

12. A system in accordance with claim 10, wherein an obstacle which cannot be moved or removed is shown on a display and a selection option makes it possible to change into the semi-automatic operating mode and/or into a manual operating mode or to continue to move in the automatic operating mode.

13. A system in accordance with claim 1, wherein the obstacle is detected with reference to sensors at the piece of equipment, advantageously 3-dimensionally.

14. A system in accordance with claim 1, wherein the obstacle is moved to several times from different directions for the more precise detection.

15. A system in accordance with claim 1, wherein the vehicle vibrations and/or vehicle strains are determined on the driving over of the working area and, if a permitted value range is exceeded, the position driven over is evaluated as an obstacle, with its position advantageously being stored in order optionally to drive around it.

16. A system, in particular in accordance with claim 1, wherein material of different composition can be processed and wherein a desired mixing ratio is automatically achieved by a corresponding control of the piece or pieces of movable equipment.

17. A system in accordance with claim 1, wherein the composition of a material region driven to by the movable piece of equipment is automatically recognized, in particular based on sensors arranged at the piece of equipment, with the sensors advantageously simultaneously serving the obstacle recognition.

18. A system in accordance with claim 1, comprising a track planning unit which calculates paths from a loading site to an unloading site and/or back, in particular based on a changed terrain model and detected obstacles.

19. A system in accordance with claim 1, comprising an input unit via which standard travel paths can be set.

20. A system in accordance with claim 18, wherein the calculation of the paths takes place while taking account of standard travel paths and recognized and/or stored obstacles.

21. A system in accordance with claim 1, comprising an input unit via which a desired mixing ratio can be set.

22. A system in accordance with claim 18, wherein the calculation of the paths takes place while taking account of a desired mixing ratio of the material, in particular in that loading sites with different material composition are selected alternatively.

23. A system in accordance with claim 18, wherein the calculation of the paths and/or of the terrain model takes place while taking account of the geometry of the working area changing by the material removal or of any other terrain changes, in particular determined from position data and/or odometric data of the machine and/or data of the obstacle recognition.

24. A system in accordance with claim 18, wherein a plurality of pieces of equipment are provided whose movement is taken into account alternately in each case on the calculation of the paths in that a data exchange takes place among the plurality of pieces of equipment.

* * * * *